United States Patent
Tyson et al.

(10) Patent No.: US 9,305,538 B2
(45) Date of Patent: Apr. 5, 2016

(54) TRANSMISSION OBSCURING COVER DEVICE

(71) Applicants: Alica Tyson, Baltimore, MD (US); Michael Green, Baltimore, MD (US)

(72) Inventors: Alica Tyson, Baltimore, MD (US); Michael Green, Baltimore, MD (US)

( * ) Notice: Subject to any disclaimer, the term of this patent is extended or adjusted under 35 U.S.C. 154(b) by 21 days.

(21) Appl. No.: 14/303,783

(22) Filed: Jun. 13, 2014

(65) Prior Publication Data

US 2015/0364124 A1    Dec. 17, 2015

(51) Int. Cl.
*G01S 1/72*    (2006.01)
*G10K 11/16*   (2006.01)

(52) U.S. Cl.
CPC ..................... *G10K 11/16* (2013.01)

(58) Field of Classification Search
CPC .......................................................... G01S 1/72
USPC ................................. 181/149, 121
See application file for complete search history.

(56) References Cited

U.S. PATENT DOCUMENTS

| | | | |
|---|---|---|---|
| 5,828,012 A * | 10/1998 | Repolle et al. | 181/175 |
| 6,370,362 B1 * | 4/2002 | Hansen et al. | 455/90.1 |
| 6,512,834 B1 * | 1/2003 | Banter et al. | 381/386 |
| 7,581,893 B2 | 9/2009 | Miramontes | |
| 8,242,924 B2 | 8/2012 | Huang et al. | |
| D669,112 S * | 10/2012 | Gustaveson | D16/237 |
| 8,471,956 B2 | 6/2013 | Fortmann | |
| 2003/0211337 A1 | 11/2003 | Muraoka | |
| 2004/0185281 A1 | 9/2004 | Suh et al. | |
| 2005/0077102 A1 * | 4/2005 | Banter et al. | 181/149 |
| 2005/0220448 A1 * | 10/2005 | Tei et al. | 396/25 |
| 2007/0212059 A1 | 9/2007 | Kim et al. | |
| 2010/0000671 A1 | 1/2010 | Hwang | |
| 2011/0058255 A1 | 3/2011 | Weiss | |
| 2014/0198439 A1 * | 7/2014 | De Pietro et al. | 361/679.02 |

FOREIGN PATENT DOCUMENTS

| | | | | |
|---|---|---|---|---|
| CN | 202085205 | | 12/2011 | |
| DE | 202013005328 | * | 11/2013 | H04M 1/02 |

OTHER PUBLICATIONS

Title of Source: www.amazon.com Product Name: Webcam Cover.

* cited by examiner

*Primary Examiner* — Forrest M Phillips

(57) ABSTRACT

A transmission obscuring cover device obscures video and audio transmissions from an electronic apparatus. The device includes a panel having a bottom surface. An adhesive is coupled to the bottom surface for being adhered to an electronic apparatus. The panel is a sound absorber wherein the panel is configured for being positioned over a microphone of the electronic apparatus to inhibit transmission of sound to the microphone.

13 Claims, 3 Drawing Sheets

TRANSMISSION OBSCURING COVER DEVICE

BACKGROUND OF THE DISCLOSURE

Field of the Disclosure

The disclosure relates to cover devices and more particularly pertains to a new cover device for obscuring video and audio transmissions from an electronic apparatus.

SUMMARY OF THE DISCLOSURE

An embodiment of the disclosure meets the needs presented above by generally comprising a panel having a bottom surface. An adhesive is coupled to the bottom surface for being adhered to an electronic apparatus. The panel is a sound absorber wherein the panel is configured for being positioned over a microphone of the electronic apparatus to inhibit transmission of sound to the microphone.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
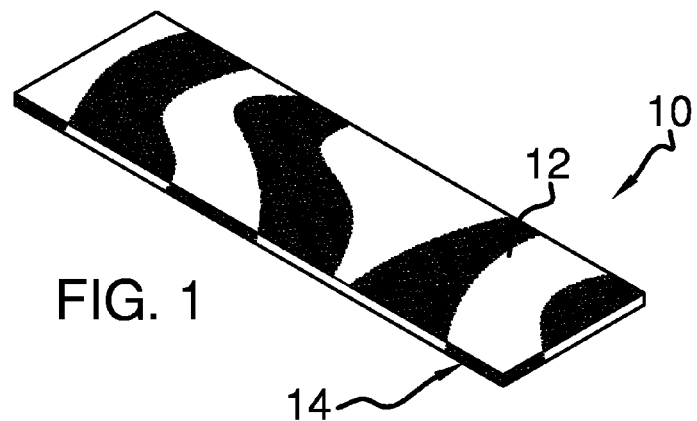
FIG. 1 is a top front side perspective view of a transmission obscuring cover device according to an embodiment of the disclosure.
Figure 2:
FIG. 2 is a top view of an embodiment of the disclosure.
Figure 3:
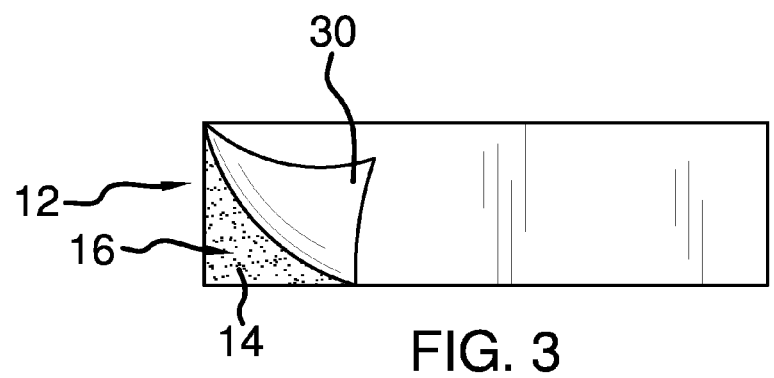
FIG. 3 is a bottom view of an embodiment of the disclosure.
Figure 4:
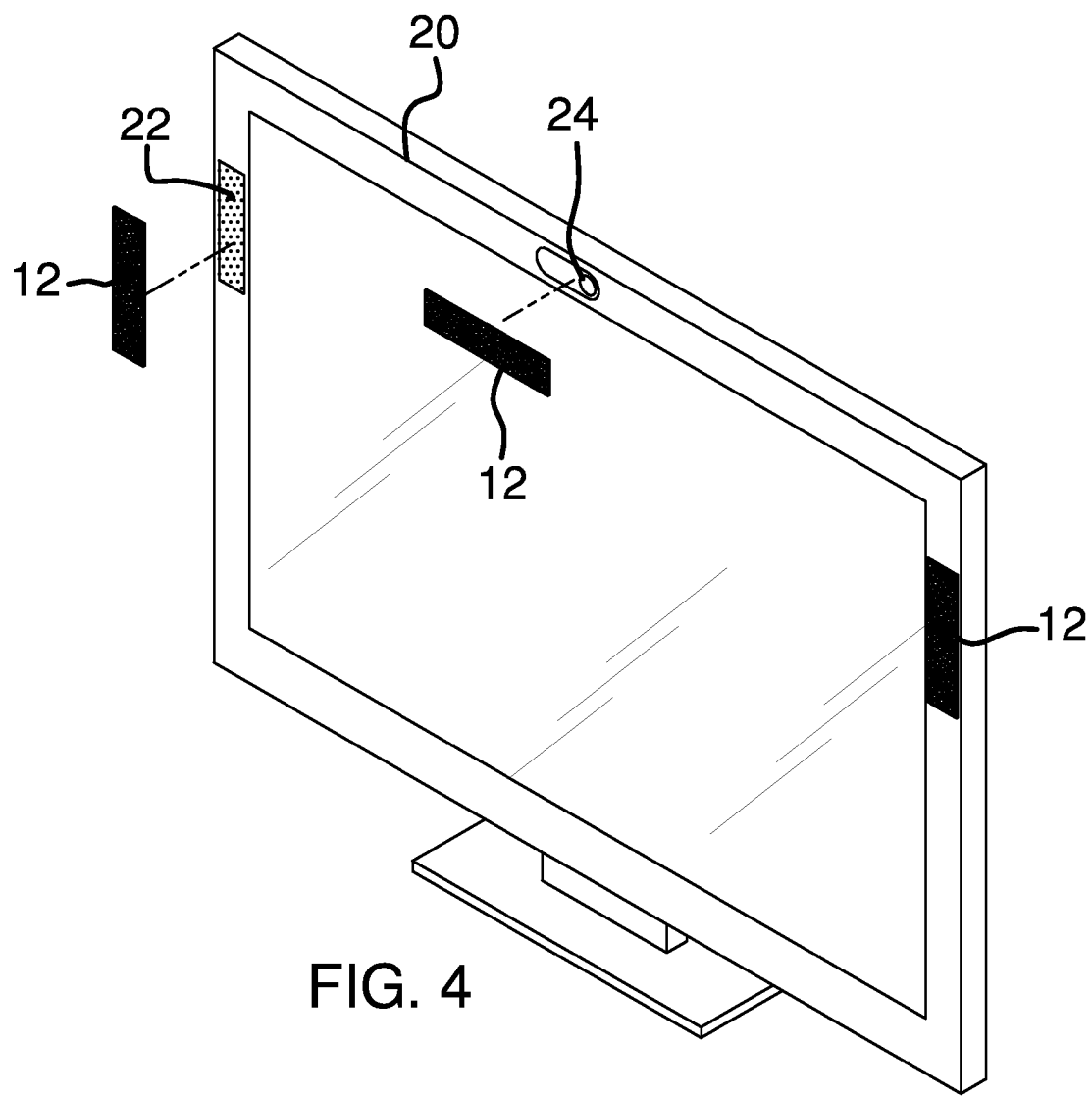
FIG. 4 is a partially exploded top front side perspective view of an embodiment of the disclosure in use.
Figure 5:
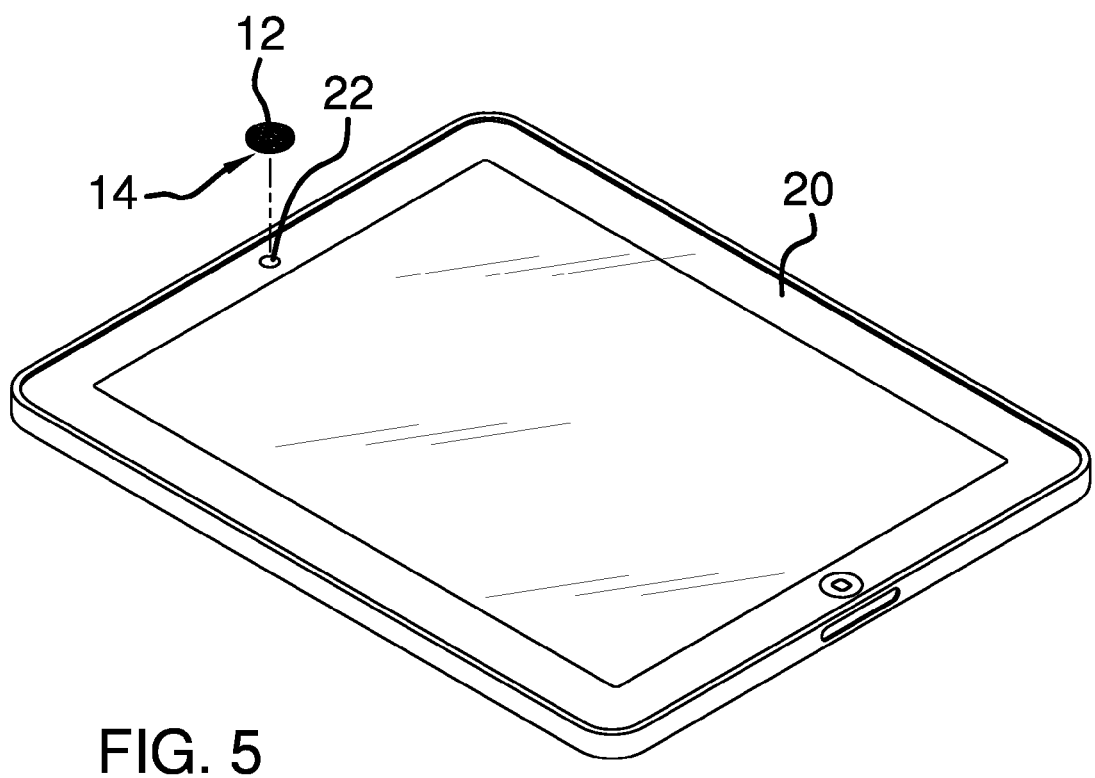
FIG. 5 is a partially exploded top front side perspective view of an embodiment of the disclosure.

With reference now to the drawings, and in particular to FIGS. 1 through 5 thereof, a new cover device embodying the principles and concepts of an embodiment of the disclosure and generally designated by the reference numeral 10 will be described.

As best illustrated in FIGS. 1 through 5, the transmission obscuring cover device 10 generally comprises a panel 12 having a bottom surface 14. An adhesive 16 is coupled to the bottom surface 14 wherein the panel 12 is configured for being adhered to an electronic apparatus 20 such as a laptop computer, smartphone, computer tablet or the like. The adhesive 16 may completely cover the bottom surface 14 of the panel 12. The panel 12 is a sound absorber wherein the panel 12 is configured for being positioned over a microphone 22 of the electronic apparatus 20 to inhibit transmission of sound to the microphone 22. The panel 12 is also opaque wherein the panel 12 is configured for inhibiting a camera 24 of the electronic apparatus 20 from receiving images when the panel 12 is positioned to extend over the camera 24. A backing 30 is coupled to the panel 12 covering the adhesive 16. The backing 30 is removable from the panel 12 exposing the adhesive 16 to permit adhering the panel 12 to the electronic apparatus 20.

The panel 12 may be constructed of an open cell rubber foam, a melamine sponge, or the like. The panel 12 may be an elongated rectangle, circular, or shaped to cover the microphone 22 and camera 24 of a particular electronic apparatus 20 without otherwise obscuring use of the electronic apparatus 20.

In use, the device 10 is positioned over the microphone 22 and the camera 24 of the electronic apparatus 20. Such positioning blocks use of the camera 24 and microphone 22 in the event the electronic apparatus is access and controlled by an extrinsic threat such as a hacker or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A transmission obscuring cover device comprising:
   a panel having a bottom surface, said bottom surface being continuous extending inwardly from peripheral edges of said panel;
   an adhesive coupled to said bottom surface wherein said panel is configured for being adhered to an electronic apparatus such that said bottom surface extends over a microphone and a camera of the electronic apparatus; and
   said panel being a sound absorber wherein said panel is configured for inhibiting transmission of sound to the microphone, said panel being opaque wherein said panel is configured for inhibiting a camera of the electronic apparatus from receiving images when said panel is positioned to extend over the camera.

2. The device of claim 1, further comprising.

3. The device of claim 1, further comprising a backing coupled to said panel, said backing covering said adhesive, said backing being removable from said panel exposing said adhesive.

4. The device of claim 1, further comprising said panel being constructed of an open cell rubber foam.

5. The device of claim 1, further comprising said panel being constructed of a melamine sponge.

6. The device of claim 1, further comprising said adhesive completely covering said bottom surface of said panel.

7. The device of claim 1, further comprising said panel being an elongated rectangle.

8. The device of claim 1, further comprising said panel being circular.

9. A transmission obscuring cover device comprising:

a panel having a bottom surface, said bottom surface being continuous extending inwardly from peripheral edges of said panel;

an adhesive coupled to said bottom surface wherein said panel is configured for being adhered to an electronic apparatus such that said bottom surface extends over a microphone and a camera of the electronic apparatus, said adhesive completely covering said bottom surface of said panel;

said panel being a sound absorber wherein said panel is configured for being positioned over the microphone of the electronic apparatus to inhibit transmission of sound to the microphone;

said panel being opaque wherein said panel is configured for inhibiting the camera of the electronic apparatus from receiving images when said panel is positioned to extend over the camera; and a backing coupled to said panel, said backing covering said adhesive, said backing being removable from said panel exposing said adhesive.

10. The device of claim 9, further comprising said panel being constructed of an open cell rubber foam.

11. The device of claim 9, further comprising said panel being constructed of a melamine sponge.

12. The device of claim 9, further comprising said panel being an elongated rectangle.

13. The device of claim 9, further comprising said panel being circular.

* * * * *